(12) United States Patent
Werries et al.

(10) Patent No.: US 12,404,743 B2
(45) Date of Patent: Sep. 2, 2025

(54) RUPTURE DISC ASSEMBLY

(71) Applicant: NCS MULTISTAGE INC., Calgary (CA)

(72) Inventors: Michael Werries, Calgary (CA); Brock Gillis, Calgary (CA); Daniel Stannus, Calgary (CA); Timothy Johnson, Calgary (CA); Masoud Kalantari, Calgary (CA)

(73) Assignee: NCS MULTISTAGE INC., Calgary (CA)

( * ) Notice: Subject to any disclaimer, the term of this patent is extended or adjusted under 35 U.S.C. 154(b) by 0 days.

(21) Appl. No.: 18/791,183

(22) Filed: Jul. 31, 2024

(65) Prior Publication Data

US 2025/0027381 A1    Jan. 23, 2025

Related U.S. Application Data

(63) Continuation of application No. 17/915,461, filed as application No. PCT/CA2021/050408 on Mar. 29, 2021, now abandoned.

(60) Provisional application No. 63/155,266, filed on Mar. 1, 2021, provisional application No. 63/064,841, filed on Aug. 12, 2020, provisional application No. 63/002,271, filed on Mar. 30, 2020.

(51) Int. Cl.
E21B 34/06 (2006.01)

(52) U.S. Cl.
CPC ................ *E21B 34/063* (2013.01)

(58) Field of Classification Search
CPC .................................................. E21B 34/063
See application file for complete search history.

(56) References Cited

U.S. PATENT DOCUMENTS

| | | | |
|---|---|---|---|
| 9,593,542 | B2 | 3/2017 | Getzlaf et al. |
| 10,316,979 | B2 | 6/2019 | Petrowsky |
| 10,519,753 | B2 | 12/2019 | Dedman et al. |
| 11,293,260 | B2 | 4/2022 | Dharne et al. |
| 2016/0060998 | A1 | 3/2016 | Hiorth et al. |
| 2019/0017345 | A1 | 1/2019 | Brandsdal |
| 2021/0017833 | A1 | 1/2021 | Saraya |

FOREIGN PATENT DOCUMENTS

WO    2020131076 A1    6/2020

*Primary Examiner* — D. Andrews
(74) *Attorney, Agent, or Firm* — Dorsey & Whitney LLP (57) ABSTRACT

Disclosed is a rupture disc assembly for use in making a temporary seal in a vessel such as a casing string. The rupture disc assembly may generally include (A) a rupture disc having a side surface having a shallow taper inward towards a bottom surface of the rupture disc (B) an actuating mechanism including (i) an outer sled having an inner supporting surface forming a taper complimentary to the shallow taper of the side surface, (ii) an inner sled disposed within the outer sled and having a support shoulder to support the bottom surface of the rupture disc and (iii) a securing mechanism and (C) a housing to house the rupture disc and actuating mechanism.

20 Claims, 8 Drawing Sheets

RUPTURE DISC ASSEMBLY

CROSS REFERENCE TO RELATED APPLICATIONS

This application is a continuation of U.S. Non-Provisional patent application Ser. No. 17/915,461, filed Sep. 28, 2022, which is a national stage entry of International Application Serial No. PCT/CA2021/050408, filed Mar. 29, 2021, which claims the benefit of U.S. Provisional Patent Application Ser. No. 63/002,271 filed on Mar. 30, 2020, U.S. Provisional Patent Application Ser. No. 63/064,841 filed on Aug. 12, 2020 and U.S. Provisional Patent Application Ser. No. 63/155,266 filed on Mar. 1, 2021. The contents of the aforementioned applications are incorporated herein by reference.

FIELD

This disclosure relates to a rupture disc assembly for use in making a temporary seal in a vessel, for example in pipe such as tubing, casing and drill pipe, used in wellbore applications, for example in a casing string, to temporarily seal a buoyant chamber beneath the rupture disc assembly in the casing string.

BACKGROUND

A wellbore is a relatively deep and narrow hole that is typically drilled into the ground, often to locate and extract a resource, such as water, gas, or oil, from a reservoir. A wellbore is often lined with a length of a pipe (often referred to as a casing) to help stabilize the wellbore and/or to prevent fluid loss to the surrounding earth. Nonetheless, it may be difficult to run a casing to great depths in a wellbore because friction between the wellbore and the casing can provide a substantial amount of drag. This is particularly true in horizontal and/or deviated wellbores. In some situations, the drag on the casing can exceed the available weight in a vertical segment of the wellbore. Also, segments in wellbores are not necessarily drilled straight and may end up more helical during drilling, and this may contribute to the drag on the casing as well. If there is insufficient weight in the vertical segment of the wellbore, it may be difficult or impossible to overcome the drag in the horizontal leg of the wellbore and land the casing at a desired depth, such as for example, the toe of a well. Failing to land the casing at the toe of the wellbore results in a loss of direct access to a formation surrounding the toe of the well which can reduce production capacity of the reservoir.

One approach for mitigating casing drag is to lighten or "float" a portion of the casing in the wellbore, thereby creating a buoyant chamber within the casing, for example at a portion of the casing that is meant to be driven around a heel of the wellbore to land in a horizontal segment of the wellbore. The buoyant chamber can span some or all of the horizontal segment and may also include the heel and a portion of the vertical segment as well. A buoyant chamber can be formed within this portion of the casing by placing two spaced apart seals or plugs within a lower portion to seal in a low density fluid (for e.g. air) within the chamber. This buoyant chamber is run into the wellbore and is advanced toward the toe of the well as further joints of casing are added from surface. To drive the casing and buoyant chamber further into the wellbore and past the heel into the horizontal segment of the wellbore, a higher density fluid may be pumped into the casing above the buoyant chamber to add weight and drive the casing further toward the toe of the wellbore. This method of floating the horizontal segment of casing reduces drag for the buoyant chamber/casing. After the casing has landed, the buoyant chamber is no longer needed and can be removed, particularly for example, by removing a plug at the up-hole end of the casing to allow the wellbore fluids to mix. The well is then cemented to isolate the annulus, by pumping cement into the wellbore, through the toe of the well, and into the annular space between the wellbore and the casing. A wiper plug is pumped downhole after the cement to drive cement remaining in the wellbore through the toe of the well, leaving the casing inner diameter open, but with the casing annulus cemented for isolation purposes.

An existing technique for removing the plugged ends of the buoyant chamber is to drill them out. In some cases, a packer is used to seal the casing above the buoyant chamber. The packer may be removed from the casing string using a conventional drill-type work string, for example. Drilling out the plugged ends of the buoyant chamber adds an operational step to the completion process, increasing completion time cost, and risk.

Another approach is to design a plugged end that can be destroyed without drilling. For example, a plugged end can be configured as a rupture assembly capable of withstanding nominal hydrostatic pressure of the column of fluid above, while the pipe (for e.g. casing) is being moved into the wellbore, but that is also capable of breaking when subjected to a higher force/pressure, such as a threshold hydraulic pressure that is intentionally produced in the column of fluid above the rupture assembly using a hydraulic pump for example. In order to sustain high pressures while the pipe (e.g. casing) is being moved into the wellbore, the rupture disc assembly can be designed to be relatively thick or otherwise resistant to breakage under operational conditions during run-in of casing.

As completion technology improves, operators may wish to drill deeper/longer wells and produce from longer horizontal segments under a variety of pressure and temperature conditions without introducing new steps, costs, or operational risks. Therefore, it is desired to continuously improve the performance and reliability of rupture systems used in casing buoyancy applications. Rupture systems that can be adapted to a variety of well applications, and/or that limit the volume and/or particle size of debris released to the wellbore, and/or increase the pressure competency of the rupture assembly would be desirable. High pressure competency of the rupture assembly will allow the buoyant chamber to withstand relatively high hydraulic pressures during the positioning of the casing in the wellbore and may also have a burst/breakage pressure which is significantly higher than the pressure required to activate the mechanism which causes the rupture disc assembly to commence its failure mode/mechanism.

Rupture disc devices are also used in various other applications, including running them on drill pipe during an installation of a liner hanger or in other oilfield/gas field applications.

SUMMARY

The present disclosure is generally directed to a rupture disc assembly for use in forming a temporary seal in a vessel. The rupture disc assembly is operable to change from a sealing mode in which the temporary seal is formed to a release mode in which one or more components of the rupture disc assembly are released from their position in the sealing mode and to a disc failure mode in which the temporary seal is broken.

The rupture disc assembly generally includes a rupture disc having a pressure facing surface, a bottom surface, and a side surface having a shallow taper inward towards the bottom surface of the rupture disc.

The rupture disc assembly also includes an actuating mechanism configured to support the rupture disc and operable to be activated to change the rupture disc assembly from the sealing mode to the release mode and to the disc failure mode when the pressure facing surface of the rupture disc is subjected to a disc failure trigger pressure. The actuating mechanism includes: (i) an outer sled operable to move in a downhole direction from a first position to a second position after activation of the actuating mechanism and has an inner supporting surface having an uphole portion and a downhole portion having an inward taper complementary to and abutting the shallow taper of the side surface of the rupture disc; (ii) an inner sled disposed within the outer sled and which may be operable to move in a downhole direction from a first position to a second position or remain stationary in the first position after activation of the actuating mechanism and has a cylindrical inner surface, a support shoulder in abutment with at least a segment of the bottom surface of the 10 rupture disc and a bottom surface; and (iii) a securing mechanism operable to secure the outer sled and inner sled in their first positions and release the outer sled and inner sled after activation of the actuating mechanism.

The rupture disc assembly also includes a housing operable to house the rupture disc and actuating mechanism, the housing comprising a) an upper tubular member having an upper end, a lower end and an interior surface defining a fluid passageway therethrough and b) a lower tubular member having an upper end coupled to the lower end of the upper tubular member, a lower end and an interior surface defining a fluid passageway therethrough and a stop shoulder positioned on the interior surface operable to stop downhole movement of the inner sled and outer sled. The rupture disc is operable to form a temporary seal within the rupture disc assembly when the inner sled and outer sled are in their first positions and to rupture breaking the seal after the inner sled has moved to its second position, or in embodiments where the inner sled is stationary after activation, after the outer sled has moved to its second position.

The present disclosure also provides an apparatus for forming a buoyant chamber in a well, the apparatus including:
a) a first length of tubing operable to be positioned in the well and having an uphole end and a downhole end operable for connection to a second length of tubing containing a float device operable for forming a lower boundary of a buoyant chamber and
b) the rupture disc assembly of the present disclosure including the rupture disc, the actuating mechanism and the housing coupled to the uphole end of the first length of tubing and operable for forming an upper boundary of the buoyant chamber during deployment of the buoyant chamber into the well.

The present disclosure also provides a casing string float assembly including a tubular having a lower seal at a lower position of the tubular to form a lower seal, the rupture disc assembly of the present disclosure at an upper position of the tubular to form an upper seal and a buoyant chamber positioned between the lower seal and the upper seal.

The present disclosure also provides a method for installing a casing string in a wellbore, the method comprising: after the casing string float assembly of the present disclosure has been run into a wellbore with a buoyant fluid maintained in the buoyant chamber, applying a hydraulic pressure through the casing string float assembly to apply pressure to the pressure facing surface of the rupture disc that is at least as great as the disc failure trigger pressure to activate the actuating mechanism thereby releasing the securing mechanism allowing the inner sled to move from the first position to the second position to break the rupture disc thereby releasing the buoyant fluid from the buoyant chamber, or in embodiments where the inner sled is stationary after activation, allowing the outer sled to move from its first position to second position to break the rupture disc thereby releasing the buoyant fluid from the buoyant chamber.

The present disclosure also provides a method of installing a casing string in a wellbore containing a well fluid having a specific gravity, the wellbore having an upper, substantially vertical portion, a lower, substantially horizontal portion, and a bend portion connecting the upper and lower portions, the method comprising: (a) running a casing string comprising the casing string float assembly of the present disclosure into the wellbore, wherein the buoyant chamber comprises a fluid having a specific gravity less than the specific gravity of the well fluid, and (b) floating at least a portion of the casing string float assembly in the well fluid into the lower, substantially horizontal portion of the wellbore.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed apparatus' and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the word "vessel" generally means a body that is configured to contain or hold a gas or liquid or a mixture thereof, and includes without limitation, a container and a tubing, for example, a pipe including, such as for example, a pipe casing or drill pipe which may be used in an oil/gas wellbore. The word "disc" as used in the present disclosure is not limited to a component that is generally circular in shape while the terms "upper" and "top" refer to the uphole direction that is toward the surface of the oil/gas wellbore and the terms "lower" and "bottom-refer to the downhole direction that is toward the toe of the oil/gas wellbore. The terms "abut(s)", "abutting" and "abutment" are used herein in a broad lay sense to mean next or adjacent to, having a common boundary or in contact directly.

"Disc Rupture Pressure" refers to a minimum pressure applied to a pressure facing surface of a rupture disc sufficient to cause the rupture disc to rupture or burst. "Acting Pressure" refers to a total pressure applied to a pressure facing surface of the rupture disc during a particular operation (e.g. hydrostatic and dynamic when running casing string into the wellbore). "Disc Failure Trigger Pressure" refers to a minimum pressure applied to a pressure facing surface of the rupture disc sufficient to activate/trigger an actuating mechanism.

Float Tool

Figure 1:
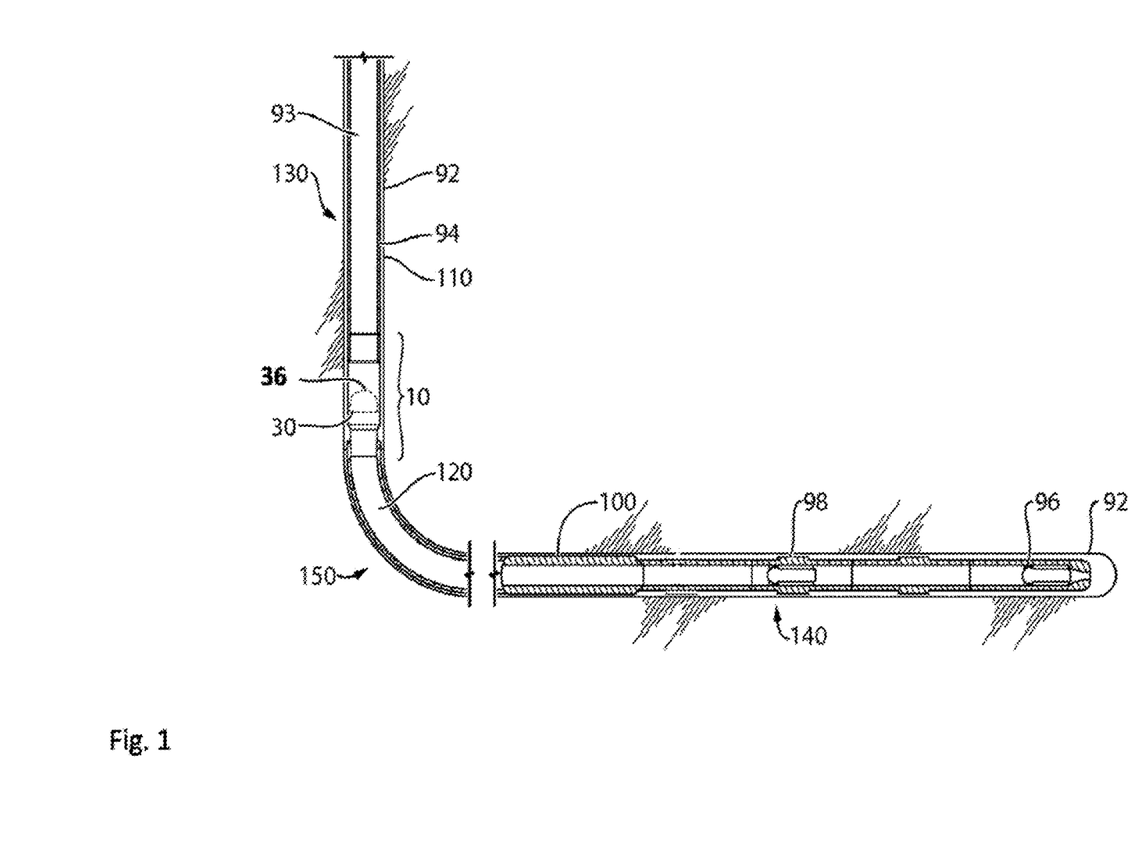
FIG. 1 is a cross-sectional view of a float tool with a rupture disc assembly installed within a casing string in a wellbore.

Referring to FIG. 1, there is shown a float tool comprising a rupture disc assembly 10 according to an embodiment of the present disclosure installed as part of a casing string 94 in a wellbore 92. The wellbore 92 is shown as a relatively deep and narrow hole, including a vertical segment 130 and a horizontal segment 140, although other deviated wellbores of varying shapes are possible. The wellbore 92 may contain a fluid (for e.g. drilling mud (not shown)) and the well is continuous with a reservoir containing a producible fluid for example, ground water, oil, a gas or any mixture thereof. In FIG. 1, the float tool has already been run into the wellbore 92 with a gap between the casing string 94 and the wellbore 92 resulting in an annulus 110.

In operation, the rupture disc assembly 10 may be in a sealing mode, a release mode or a disc failure mode. When in the sealing mode, the rupture disc assembly 10 forms a temporary seal or isolation barrier which isolates a fluid-filled upper section 93 of the casing string 94 from a buoyant chamber 120 formed in the casing string 94 between the rupture disc assembly 10 and a sealing device, such as a float shoe 96, disposed at a lower end of the casing string 94. In the illustrated example of FIG. 1, the rupture disc assembly 10 is installed in the casing string 94 so that it is positioned in the vertical segment 130 of the wellbore 92, proximal to a bend 150 leading to the horizontal segment 140 of the wellbore 92. This placement is not limiting and variations in the placement of the rupture disc assembly 10 in the casing string 94 are possible. Generally, the rupture disc assembly 10 should be positioned in the casing string 94 to increase or maximize vertical weight on the casing string 94 via the fluid-filled upper section 93 while reducing or minimizing weight and friction in the horizontal segment.

In some embodiments, the buoyant chamber 120 is filled with air which can reduce the amount of weight needed in the fluid-filled upper section 93 to run the casing string 94 into the wellbore 92. However, the buoyant chamber 120 may be filled with other fluids having a density less than the fluid in the fluid-filled upper section 93. For example, in some embodiments, the buoyant chamber 120 is filled with a gas, for example nitrogen, carbon dioxide or other suitable gas. Light liquids may also be possible, for example gas condensate. Generally, the buoyant chamber 120 is filled with fluid that has a lower specific gravity than well fluid in the wellbore 92 and generally the choice of which gas or liquid to use is dependent on various factors, such as well conditions and the amount of buoyancy desired.

The rupture disc assembly 10 includes a rupture disc 30 that forms the upper boundary or upper seal of the buoyant chamber 120. The rupture disc assembly 10 changes from the sealing mode to the release mode when the rupture disc is released from the upper seal position and moves in a downhole direction to the disc failure mode when the rupture disc 30 is ruptured thus breaking the upper seal as will be further discussed below. The rupture disc 30 includes all shapes and configurations of rupture-type diaphragms, including but not limited to hemispherical dome-shaped discs 36 as well as flat or substantially flat discs. The rupture disc 30 may be manufactured and calibrated to hold pressure up to a certain magnitude before it ruptures or bursts (i.e. its burst pressure). Thus, the burst pressure of the rupture disc 30 must be greater than the acting pressure in the casing string 94 when the casing string 94 is being run into the wellbore in order to avoid undesired rupturing or breaking of the rupture disc 30 in the disc failure mode. Any distance between the float shoe 96 and the rupture disc 30 may be selected in order to provide a sufficient buoyancy force to run the casing string 94 into the wellbore 92 and to increase or maximize the vertical weight of the casing string 94 via the fluid-filled upper section 93 as noted above.

The float shoe 96 may form a lower boundary or lower seal of the buoyant chamber 120. As will be appreciated, an alternative float device, such as a float collar 98, may be used as a substitute for or addition to the float shoe 96. Float shoes, float collars and similar devices are herein referred to as "float devices". In the illustrated example, both the float shoe 96 and the float collar 98 are included in the casing string 94. In some embodiments, the float collar 98 is positioned uphole of the float shoe 96. When present, the float collar 98 serves as a redundant fluid inflow prevention means. The float collar 98 is similar in construction to the float shoe 96 and includes a valve (not shown) that prevents wellbore fluid from entering the buoyant chamber 120. Similarly, the float shoe 96 generally includes a check valve (not shown) that prevents inflow of wellbore fluid during the running in or lowering of the casing string 94 into the wellbore 92.

Float shoes 96 are generally known in the art. For example, U.S. Pat. Nos. 2,117,318 and 2,008,818 describe float shoes, the contents of which are incorporated herein by reference. Float shoes 96 may be closed by assistance with a spring. Once closed, pressure outside the float shoe 96 may keep it closed. In some float shoes 96, its check valve can be opened when fluid flow through the casing string 94 is desired, for example, when cementing operations are to begin. In some cases, the float shoe 96 may be drilled out after run-in is complete. When present, the float collar 98 often has a landing surface for a wiper displacement plug. In addition to a float shoe 96 and/or float collar 98, a baffle collar and/or guide shoe may also be present. The float tool comprising the rupture disc assembly 10 shown in the FIG. 1 can be adapted to be compatible with most float shoes, landing collars and float collars.

In some embodiments, the landing collar 100 is positioned between the float shoe 96 and the rupture disc assembly 10. The landing collar 100 can be present on a surface of the float collar 98 when present. The landing collar 100 may be generally used in cementing operations for receiving cementing plugs, such as a wiper plug. Suitable landing collars 100 are known in the art, and the float tool does not require that a particular landing collar be used, so long as the landing collar has surface for receiving a plug and so long as the landing collar can be suitably installed on the casing string 94.

Rupture Disc Assembly

Figure 2:
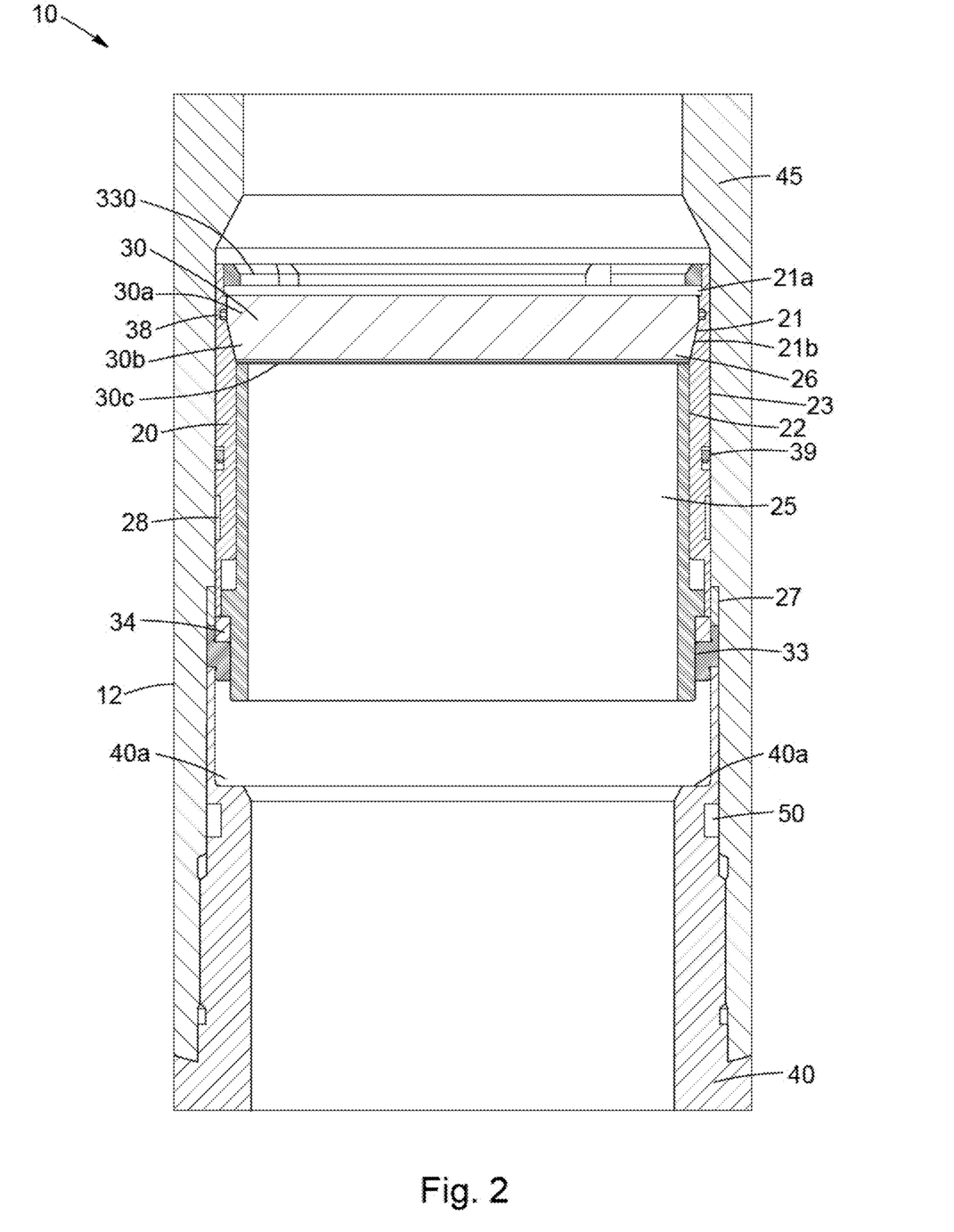
FIG. 2 is a cross-sectional view of a rupture disc assembly according to an embodiment of the present disclosure.
Figure 2A:
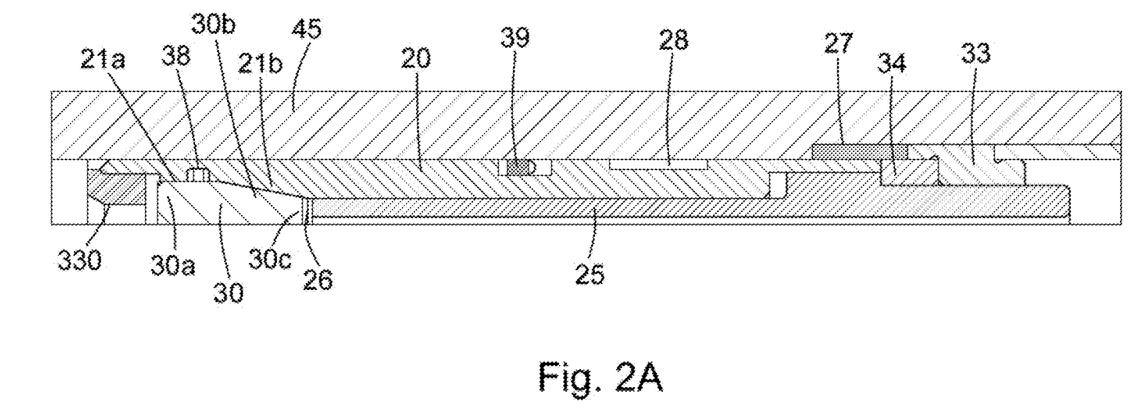
FIG. 2A is an enlarged view of a portion of the rupture disc assembly of FIG. 2.
Figure 3:
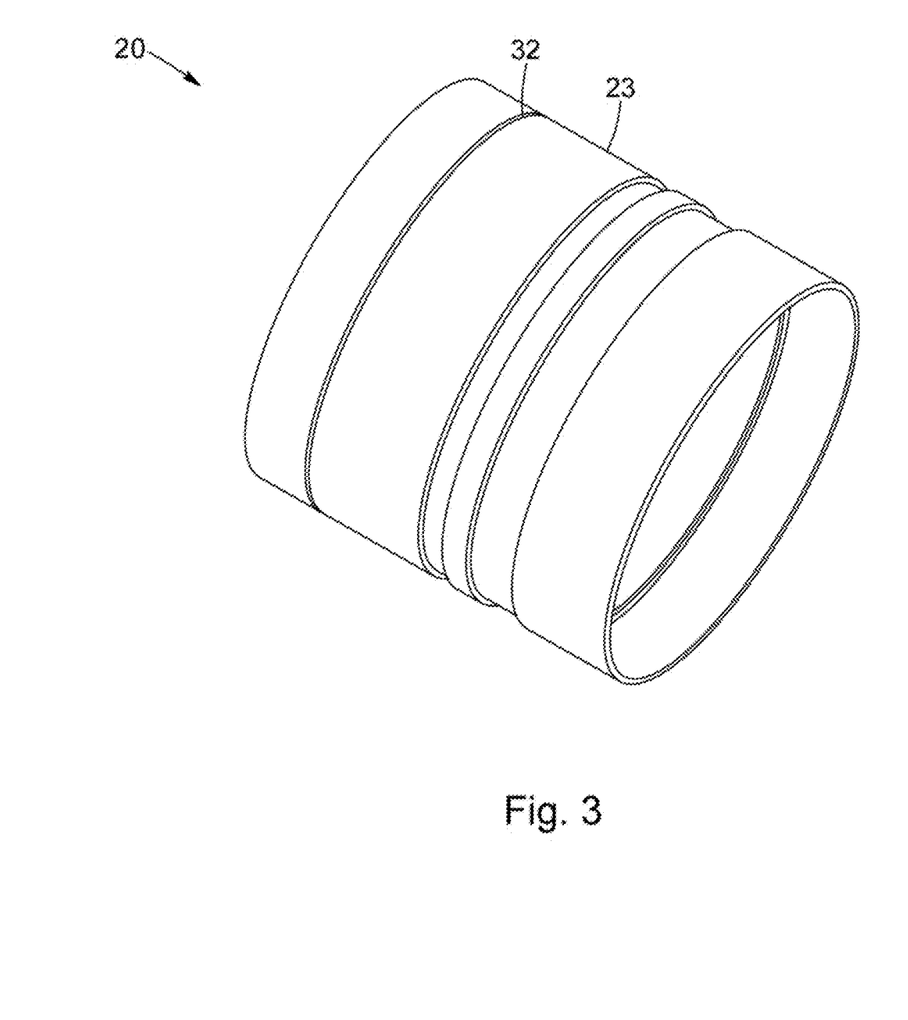
FIG. 3 is a perspective view of an outer sled of the rupture disc assembly of FIG. 2.
Figure 4:
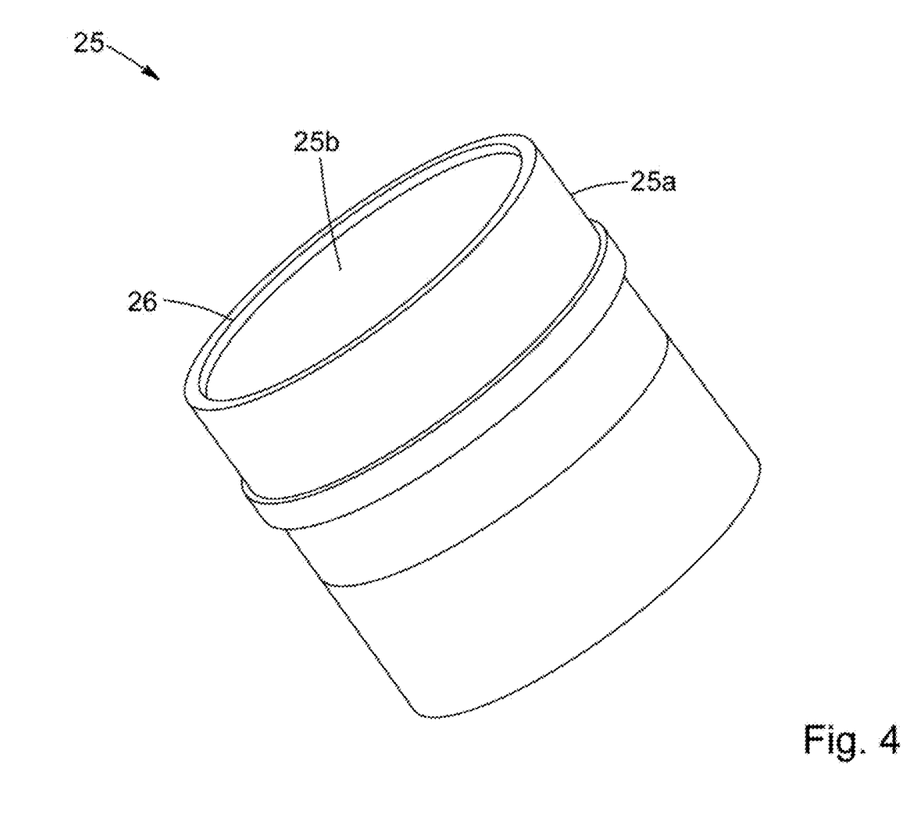
FIG. 4 is a perspective view of an inner sled of the rupture disc assembly of FIG. 2.

Referring now to FIGS. 2 and 2A, there is shown a rupture disc assembly 10 according to an embodiment of the present disclosure. As discussed above, the rupture disc assembly 10 may form part of the casing string 94 shown in FIG. 1 and includes the rupture disc 30. The rupture disc 30 has a pressure facing surface at its uphole end, which in some embodiments is generally dome-shaped (as shown in FIG. 1). The rupture disc assembly 10 further includes a bottom surface 30c at its lower end, and a side surface having an upper portion 30a that may be generally cylindrically shaped and a lower portion 30b that may be generally truncated conically shaped such that it has a shallow taper inward towards the bottom surface 30c of the rupture disc 30. The rupture disc 30 has an inherent static burst pressure based on the size, shape, type, and material quality of the disc, meaning the disc will rupture or break when supported along or near the outer edge of its bottom surface and when its pressure facing surface is subjected to a disc rupture pressure.

The rupture disc 30 may be composed of any suitable material that has relatively high compressive strength and can shatter preferably into small pieces. In some embodiments, the rupture disc 30 is composed of glass. Although silica-free glasses may be employed, in most embodiments the glass is comprised of silica (silicon dioxide) with other substances added to make the glass easier to work with and/or alter physical properties, such as boron trioxide. In other embodiments, the glass may be strengthened glass, for example thermally (tempered) or chemically strengthened soda lime glass.

In other embodiments, the rupture disc 30 is composed of a ceramic. Ceramics include inorganic, non-metallic solids comprising either metal or non-metal compounds. Traditional clay-based ceramics include porcelain, brick and earthenware. Advanced ceramics are generally not clay based but typically comprise an oxide, such as alumina ($Al_2O_3$) or zirconia ($ZrO_2$) or a non-oxide, such as boron carbide ($B_4C$) or silicon carbide (SIC).

In still other embodiments, the rupture disc 30 is composed of a glass-ceramic. Glass-ceramics are formed in the same way as a glass, followed by an additional manufacturing step comprising reheating causing partial crystallisation to yield a material with high-temperature stability, low thermal expansion, high strength and toughness. An example of a glass-ceramic is a blend of lithium oxide ($Li_2O$), alumina ($Al_2O_3$) and silica ($SiO_2$).

The rupture disc assembly 10 may further include a housing defined by one or more tubulars. In one embodiment, the housing is defined by a lower tubular member 40 having an upper end, a lower end and an interior surface defining a fluid passageway therethrough and an upper tubular member 45 having an upper end, a lower end and an interior surface defining a fluid passageway therethrough. In operation, the lower tubular member 40 defines a lower fluid passageway through its interior from the lower end of the upper tubular member 45 to the buoyant chamber 120 and the upper tubular member 45 defines an upper fluid passageway through its interior from the fluid-filled upper section 93 to the upper end of the lower tubular member 40 as shown in FIG. 1. It should be noted that when the rupture disc 30 has formed a temporary seal, fluid from upper section 93 is prevented from passing through to the buoyant chamber 120 and when the rupture disc 30 has broken, fluid from upper section 93 is able to pass through the upper and lower fluid passageways to the buoyant chamber 120.

The upper tubular member 45 and lower tubular member 40 are coupled to one another. In one embodiment, a portion of the lower end of upper tubular member 45 surrounds a portion of the upper end of lower tubular member 40. The upper tubular member 45 and the lower tubular member 40 may be mechanically joined together, for example using a threaded connection. Other interconnecting methods known to those persons skilled in the art are also possible. One or more seals between upper tubular member 45 and the lower tubular member 40 can be provided to create a fluid seal. In FIG. 2, the fluid seal is created by an O-ring seal 50.

Although not shown in the illustrated example, the upper tubular member 45 can be threaded at its upper end for coupling to other tubular members of the casing string 94, and the lower tubular member 40 can be threaded at its lower end for coupling to other tubular members of the casing string 94. It is noted that the tubulars members 40 and 45 may be coupled to other tubular members of the casing string 94 using other various coupling methods known to those skilled in the art.

In some embodiments, the upper tubular member 45 and the lower tubular member 40 can have an inner diameter that is similar to or not less than the inner diameter of the other tubular members which make up the casing string 94. In still other embodiments, the upper tubular member 45, lower tubular member 40 or both may have a portion having an inner diameter that is larger than or expanded as compared to the inner diameter of the other tubular members which make up the casing string 94 to facilitate installation of the rupture disc 30 (see FIG. 2). For example, in one embodiment the rupture disc 30 may have a diameter of about 4.8 inches. The other tubular members making up the casing string 94 may have an inner diameter of about 4.5 inches. Thus, at least one of the upper tubular member 45 or lower tubular member 40 will have a portion in which its inner diameter is larger than 4.5 inches (i.e. a radially expanded region) to facilitate placement of the rupture disc 30 therein. The above is not limiting and other diameters of the rupture disc 30 and inner diameters of the other tubular members making up the casing string and tubular members 40 and 45 are possible.

The rupture disc assembly 10 further includes an actuating mechanism 12 operable to be activated, and once activated, is operable to change the rupture disc assembly 10 from the sealing mode to the release mode and to the disc failure mode. The actuating mechanism 12 may generally include an outer sled 20, an inner sled 25 and a securing mechanism 33. The actuating mechanism 12 is configured to support the rupture disc 30 and hold it in sealing engagement when the rupture disc assembly 10 is in the sealing mode and orients the bottom surface 30c of the rupture disc 30 toward the buoyant chamber 120 and the pressure facing surface of the rupture disc 30 toward the fluid-filled upper section 93 shown in FIG. 1. The actuating mechanism 12 and rupture disc 30 are operatively coupled.

With continued reference to FIGS. 2, 2A and to 3 and 4, the outer sled 20 and inner sled 25 are configured and operable to move in a downhole direction (and may move independently from one another) from their initial or first position when the rupture disc assembly is in the sealing mode to a second position once the actuating mechanism 12 has been activated. The outer sled 20 has an inner supporting surface 21 having an uphole portion 21a and a downhole portion 21b having a generally truncated conically shape such that it has an inward taper complementary to the shallow taper of the lower portion 30b side surface of rupture disc 30 so that downhole portion 21b abuts with at least a segment of the lower portion 30b side surface. The outer sled 20 also includes a cylindrical inner surface 22 below the inner supporting surface 21 sized and configured to allow the inner sled 25 to be disposed therein, and an outer surface 23.

The inner sled 25 disposed within the outer sled 20 has an outer surface 25a, a cylindrical inner surface 25b and a support shoulder 26 that abuts with at least a segment of the bottom surface 30c of rupture disc 30. The inner supporting surface 21 and cylindrical inner lower surface 22 of outer sled 20 and cylindrical inner surface 25b of inner sled 25 define a fluid passageway from the upper tubular member 45 to the lower tubular member 40 when the rupture disc assembly 10 is in the disc failure mode. Sleds 20 and 25 may be made from any suitably strong material which is able to withstand downhole conditions, such as steel (e.g. carbon steel, alloy steel, tool steel or stainless steel).

When performing an operation in the oil/gas field (such as running a casing string with a buoyant chamber into a wellbore) and an acting pressure is applied to the pressure facing surface of a rupture disc, a top surface region of the rupture disc is generally in compression while a bottom surface region of the rupture disc is generally in tension. According to the embodiments of this disclosure, when an acting pressure is applied to the pressure facing surface of the rupture disc 30, abutment between outer sled 20 and rupture disc 30 at the downhole portion 21b of inner supporting surface 21 and the lower portion 30b side surface produces sufficient radial compression in the bottom surface region of the rupture disc 30 to significantly counteract or even cancel out the tension in the bottom surface region, especially on the bottom surface 30c. Tapering of the inner supporting surface 21 of outer sled 20 and side surface of rupture disc 30 results in the rupture disc 30 being able to withstand higher pressures applied to its pressure facing surface as it is compressed into the tapered support surface. This effectively increases the burst pressure of the disc, permitting the disc to remain in the sealing mode at pressures greater than the inherent static burst pressure of the disc.

In order to reduce or possibly substantially eliminate tensile stresses in the rupture disc 30 while pressure is being applied to its pressure facing surface, the shallow taper of the lower portion 30b side surface (and corresponding inward taper of the downhole portion 21b of inner supporting surface 21) may be designed and configured to provide a taper angle (the angle formed by the lower portion 30b side surface and bottom surface 30c) of about 10 degrees or in other embodiments between about 3 degrees to about 30 degrees, or between about 3 degrees to about 20 degrees, or between about 5 degrees to about 15 degrees, or between about 8 degrees to about 12 degrees.

In some embodiments, the shallow taper of the lower portion 30b side surface of rupture disc 30 has a length that spans more than about 30% of the rupture disc's thickness. This can ensure that a sufficient amount of the rupture disc 30 is in compression to significantly mitigate or cancel tensile stresses in the rupture disc 30, especially on the bottom surface 30c. For example, the length of the shallow taper of lower portion 30b spans more than about 35% or more than about 40% of the thickness of the rupture disc 30. Such embodiments can enable a large volume of the rupture disc 30 to be in compression at the time of breakage/failure to allow it to shatter into fine debris.

As noted above, inner sled 25 includes a support shoulder 26. Support shoulder 26, shown in more detail in FIG. 2A, extends radially inwards from the outer surface 25a to the inner surface 25b of inner sled 25. The support shoulder 26 comprises a contact surface area that is configured and operable to engage the bottom surface 30c of rupture disc 30 and provide an upward axial force on the bottom surface 30c to limit the amount of radial compression rupture disc 30 is subjected to when the contact surface area and bottom surface 30c are engaged. Furthermore, incorporation of the support shoulder 26 into the inner sled 25 enables the rupture disc 30 to be lifted off of the outer sled's downhole portion 21b of inner supporting surface 21 thereby substantially reducing or eliminating the added compression forces from the taper acting on the rupture disc 30 when the inner sled 25 moves from its first position to second position as will be discussed in further detail below.

In the illustrated embodiment shown in FIGS. 2 and 2A, the outer sled 20 and inner sled 25 are depicted in their first position relative to the upper tubular member 45 and lower tubular member 40 when the rupture disc assembly 10 is in the sealing mode. The actuating mechanism 12 includes a securing mechanism 33 that may be, for example, a shear ring, that is configured and operable to secure the outer sled 20 and inner sled 25 to the upper and lower tubular members 45 and 40 in their first positions and release the outer sled 20 and inner sled 25 when the pressure facing surface of rupture disc 30 is subjected to the disc failure trigger pressure. In particular, in operation the shear ring 33 is operable to prevent downhole movement of the outer and inner sleds 20 and 25 relative to the upper and lower tubular members 45 and 40 when an acting pressure (which is below the disc failure trigger pressure and disc rupture pressure as referenced above) or a range of such acting pressures is applied to the pressure facing surface of the rupture disc 30. Thus, during the running in of a casing string 94 into the wellbore 92 (shown in FIG. 1), the maximum acting pressure applied to the pressure facing surface of the rupture disc 30 can not exceed the disc failure trigger pressure in order to maintain the rupture disc assembly in the sealing mode. When it's desired to change the rupture disc assembly 10 to the disc failure mode, the actuating mechanism 12 may be activated by increasing the acting pressure to a pressure at or above the disc failure trigger pressure. The shear ring 23 is configured to break when the pressure facing surface of rupture disc 30 is subjected to the disc failure trigger pressure thereby activating the actuating mechanism 12. Upon such activation, rupture disc assembly 10 moves from the sealing mode to the release mode (i.e. the outer and inner sleds 20 and 25 are released from restraint and begin to move downhole relative to the lower and upper tubular members 40 and 45 towards their second positions). More specifically, subjecting the pressure facing surface of the rupture disc 30 to acting pressure that is at or exceeds the disc failure trigger pressure causes the shear ring 33 to break thereby releasing the inner and outer sleds 20 and 25 from restraint and enabling the movement of the sleds 20 and 25 downhole towards their second positions and thus changing the rupture disc assembly 10 to the release mode. The disc failure trigger pressure can be, for example, between about 2,500 psi to about 8,500 psi, depending on the materials and configuration of the shear ring 33. In some embodiments, the disc failure trigger pressure may even be greater, for example between about 10,000 psi to about 14,000 psi, or even greater than about 14,000 psi. A load ring 34 may be used to ensure that an even pressure is applied to shear ring 33 from outer and inner sleds 20, 25 and prevent undesired or premature breaking of shear ring 33 before the disc failure trigger pressure is reached.

While shear ring 33 is an example of a securing mechanism for restraining movement, other securing mechanisms may be used, such as shear pins, shear tabs or other shearable devices like a collet.

Figure 5:
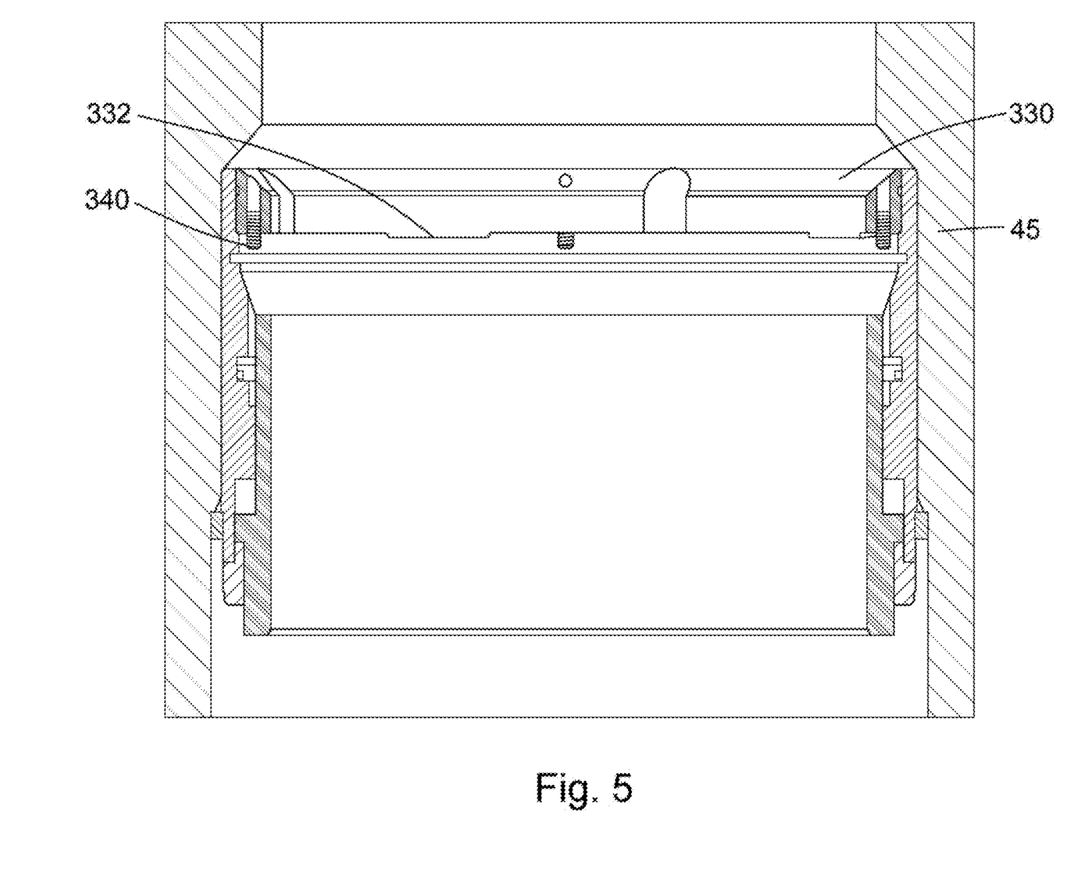
FIG. 5 is a cross-sectional view of the rupture disc assembly of FIG. 2.
Figure 6:
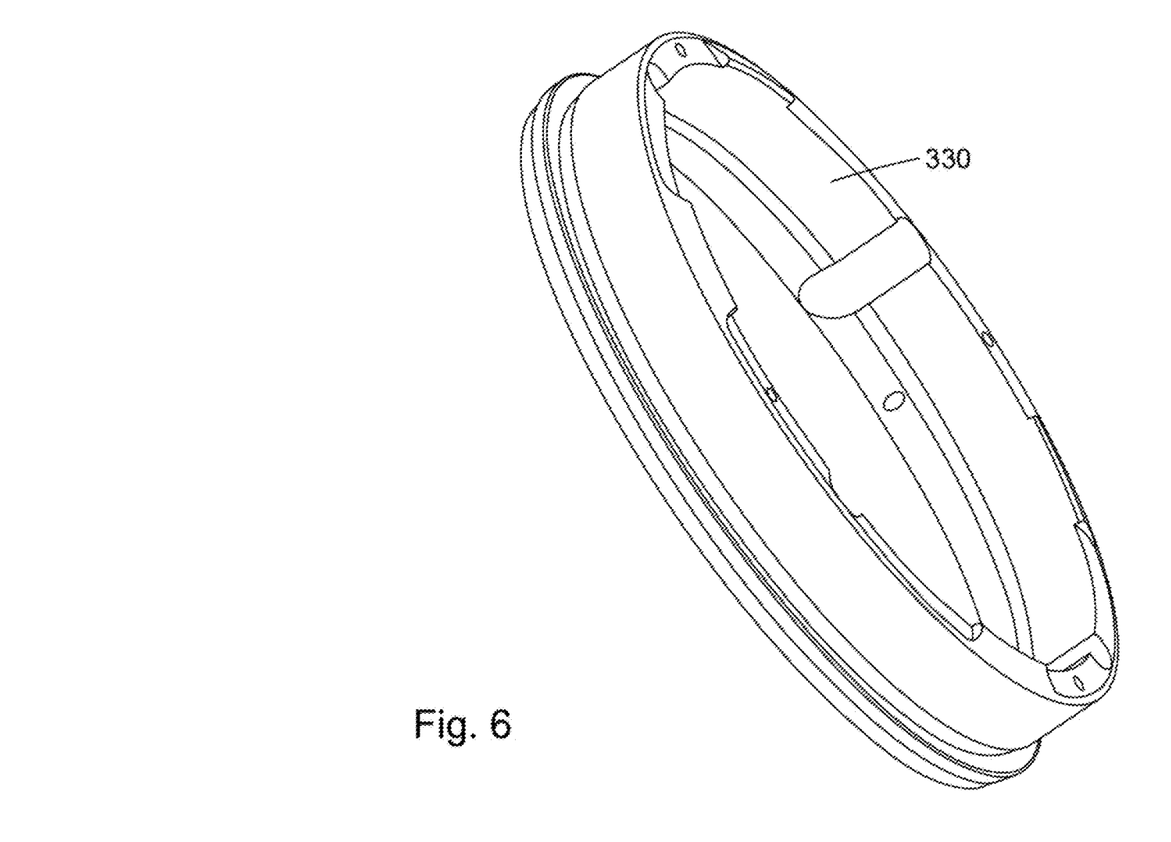
FIG. 6 is a perspective view of a top ring of the rupture disc assembly of FIG. 2.
Figure 7:
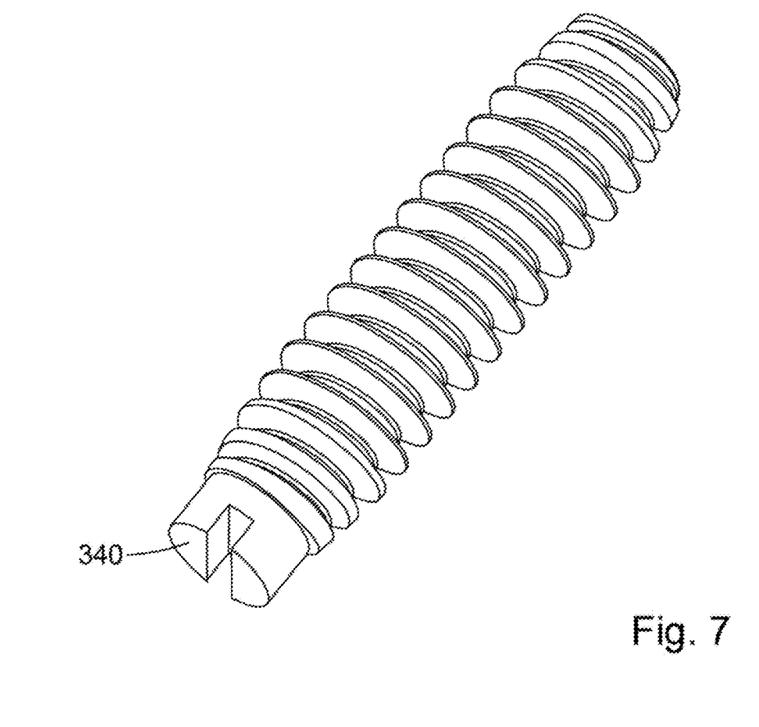
FIG. 7 is a perspective view of a screw of the rupture disc assembly of FIG. 2.

With reference to FIGS. 2, 5, 6, and 7, the rupture disc assembly 10 may further include a ring 330. Ring 330 is sized and configured to abut the uphole portion 21a of inner supporting surface 21 of outer sled 20 to assist in securing the rupture disc 30. The ring 330 may be secured to the outer sled 20, such as by a threaded connection, and is operable to move in a downhole direction with the outer sled 20 upon activation of the actuating mechanism. Ring 330 does not need to be a seal and can be retained in the housing even after the rupture disc 30 breaks to avoid its release to the wellbore, Ring 330, shown in greater detail in FIG. 6, may have an inner diameter less than the inner diameter of the upper portion 30a side surface and an impact surface on its bottom end which may include a plurality of inwardly projecting spaced apart ridges 332 or in some embodiments, a plurality of screws which may be comprised of nylon or plastic or a plurality of tips which may be comprised of carbide. Ring 330 may also include a number of holes 334 for receiving screws 340 therethrough. As shown in FIG. 5, when installed, screws 340 protrude from the bottom end of ring 330. Through this configuration, rupture disc 30 is maintained in the position shown in FIG. 5 and avoids direct contact with the bottom end impact surface of ring 330. This may prevent any undesired impacts between rupture disc 30 and ring 330 that may cause unintentional breakage of the rupture disc 30, for example during shipping and installation of rupture disc assembly 10. An example of a suitable screw 340 is shown in FIG. 7, and in some embodiments may be comprised of plastic or nylon.

As noted above, upon activation of the actuating mechanism 12, the securing mechanism 33 (i.e. shear ring) releases the outer and inner sleds 20, 25 from their securement with the lower and upper tubular members 40 and 45 allowing the inner sled 25 and outer sled 20 to begin movement in the downhole direction towards stop shoulder 40a of lower tubular member 40. Stop shoulder 40a is operable to prevent further downhole movement of the sleds 20 and 25 upon contact with the lower ends of sleds 20 and 25 (i.e. the inner and outer sleds have moved to their second positions when their lower ends contact stop shoulder 40a). Because the lower end of inner sled 25 is positioned further downhole than the lower end of outer sled 20 when they are in their first positions, the lower end of inner sled 25 will contact stop shoulder 40a before the lower end of outer sled 20 and inner sled's 25 downhole movement will therefore stop before the outer sled's 20 downhole movement stops. Accordingly, inner sled 25 will reach its second position before the outer sled 20 reaches its second position.

Thus, during operation and after activation of the actuating mechanism, inner and outer sleds 25 and 20, along with rupture disc 30 and ring 330, will begin to move in a downhole direction in the release mode. When inner sled 25 reaches its second position, its downhole movement will stop while the outer sled 20, rupture disc 30 and ring's 330 movement in the downhole direction will continue. This decoupling of movement of the inner sled 25 and the outer sled 20 effectively allows the upward axial force produced by the contact surface area of support shoulder 26 on the bottom surface 30c of rupture disc 30 to temporarily lift the rupture disc 30 off of the downhole portion 21b of inner supporting surface 21 of the outer sled 20. This temporary lift or disengagement of rupture disc 30 from outer sled 20 reduces or eliminates the taper-induced radial compression in the lower region of rupture disc 30 which in turn reduces the disc rupture pressure at which the rupture disc 30 will shatter/break in the disc failure mode. If the reduced disc rupture pressure is less than the acting pressure at that time, the rupture disc 30 will shatter/break while if it is greater than the acting pressure at that time the rupture disc 30 will not shatter/break. In this case, continued downhole movement of the outer sled 20 and ring 330 will result in the impact surface on the bottom end of ring 330 to contact/collide with the rupture disc 30 imparting an impact force to the rupture disc 30 that is sufficient to shatter/break rupture disc 30. When the impact surface comprises ridges 332 (or screws or tips), the impact force is imparted to the rupture disc 30 in a plurality of point loads which may further assist in ensuring that rupture disc 30 will shatter/break. Furthermore, if the rupture disc 30 is still temporarily disengaged from the inner supporting surface 21 of the outer sled 20 when the impact surface of the ring 330 collides with the rupture disc 30, the impact force required to shatter/break the rupture disc 30 will be lower than if the rupture disc 30 was still engaged with the inner supporting surface 21. Thus, in such embodiments, breaking of the rupture disc 30 can occur from a force produced by: application of acting pressure on the rupture disc; application of an impact force on the rupture disc produced by downhole movement and contact by ring 330; or, by application of such forces in combination.

As noted above, in some embodiments, the inner sled 25 remains stationary in its first position when the rupture disc assembly 10 is in the release and disc failure mode. In these embodiments, upon activation of the actuating mechanism 12, the securing mechanism 33 (i.e. shear ring) releases the outer sled 20 and inner sled 25, from securement with the lower and upper tubular members 40 and 45 allowing the outer sled 20 to begin movement in the downhole direction towards stop shoulder 40a of lower tubular member 40. The inner sled 25 is configured so that its lower end is already engaged with stop shoulder 40a or other ledge when the rupture disc assembly 10 is in the sealing mode and will not move in the downhole direction after the actuating mechanism 12 is activated. Again, stop shoulder 40a is operable to prevent downhole movement of outer sled 20 upon contact with the lower end of outer sled 20 (i.e. the lower end of the inner sled 25 is in contact with stop shoulder 40a or other ledge and is stationary and therefore remains in the first position and outer sled 20 moves from the first position to the second position when its lower end contacts stop shoulder 40a). The lower end of inner sled 25 is positioned further downhole than the lower end of outer sled 20 when they are in their first positions and therefore the outer sled 20 will be movably disposed over inner sled 25 after the actuating mechanism 12 is activated.

During operation and after activation of the actuating mechanism, outer sled 20, but not inner sled 25, along with rupture disc 30 and ring 330, will begin to move in a downhole direction in the release mode towards stop shoulder 40a. When the lower end of outer sled 20 reaches stop shoulder 40a, such movement will stop. During downhole movement, the impact surface on the bottom end of ring 330 will contact/collide with the rupture disc 30 imparting an impact force to the rupture disc 30 that is sufficient to shatter/break rupture disc 30 in the disc failure mode. When the impact surface comprises ridges 332 (or screws or tips), the impact force is imparted to the rupture disc 30 in a plurality of point loads which may further assist in ensuring that rupture disc 30 will shatter/break. As described above, if the rupture disc 30 is temporarily disengaged from the inner supporting surface 21 of the outer sled 20 when the impact surface of the ring 330 collides with the rupture disc 30, the impact force required to shatter/break the rupture disc 30 will be lower than if the rupture disc 30 was still engaged with the inner supporting surface 21. Thus, in such embodiments, breaking of the rupture disc 30 can occur from a force produced by: application of acting pressure on the rupture disc; application of an impact force on the rupture disc produced by downhole movement and contact by ring 330; or, by application of such forces in combination.

In some embodiments, the outer sled 20 may include a void 32 (see FIG. 3) surrounding its outside surface 23 to reduce or eliminate friction between the outer sled 20 and inner surface of upper tubular member 45 in order to enhance downhole movement of the outer sled 20 after the actuating mechanism 12 has been activated. The void 32 may also permit the outer sled 20 to undergo some level of flexing/deformation/strain when the rupture disc 30 is subjected to an acting pressure which may assist in allowing compression to develop in the disc 30, particularly in a region of the disc 30 where the tapered surface is located. In addition, the void 32 can provide a fluid path through which external pressure via fluid above the rupture disc assembly 10 can be applied to an upper portion of the outer sled 20 which can further increase the radial compression on the rupture disc 30.

Referring to FIGS. 2 and 2A, the disc activation mechanism 12 may further include a lock ring 27. Lock ring 27 is configured and operable to engage with a corresponding groove 28 in the outer sled 20 once the outer sled 20 reaches its second position thereby locking the outer sled 20 in the second position. However, other known locking mechanisms besides a lock ring are possible.

In still other embodiments, the rupture disc assembly 10 may include annular seals 38 and 39 (e.g. an O-ring seal) positioned around the upper portion 30a of the side surface of the rupture disc 30 and outer surface of outer sled 20 (See FIGS. 2 and 2A). The annular seals 38, 39 can assist in preventing leakage between the outer sled 20 and the rupture disc 30 and upper tubular member 45 and/or prevent friction and premature breakage of the rupture disc 30. In some embodiments, to avoid release of the annular seals 38 and 39 into the wellbore when the rupture disc 30 breaks, the annular seals may be created by moulding a bonded rubber seal to the outer sled 20. In some embodiments, a preload applied to the rupture disc 30, upper tubular member 45 and the outer sled 20 during installation can create a seal between the rupture disc 30, upper tubular member 45 and the outer sled 20 thereby avoiding any need for the annular seals.

In the illustrated embodiment, the rupture disc 30 is shown to have a specific geometry. As indicated above, the specific geometry includes a side surface having a truncated cone shape for a bottom portion 30b and a cylindrical shape for a top portion 30a. Notably, there is no taper with the cylindrical shape, but the truncated conical shape provides the shallow angle taper described above. However, it is to be understood that other geometries are possible for rupture disc 30. In general, geometries that enable radial compression on the bottom surface 30c can be employed. Note that this can include shapes in which voids or cut-outs are present. While the illustrated embodiment shows the bottom surface 30c of the rupture disc 30 as generally flat, other shapes may further improve the radial compression on the bottom surface 30 or lower region of the disc 30. For example, the bottom surface 30c may be concave-shaped. The concave-shaped surface is an example in which a void or cut-out is present which may further increase radial compressive stress in the rupture disc 30, particularly in its lower region. The compressive stress in the rupture disc 30 is increased by volume reduction compared to a rupture disc 30 without a concave-shaped bottom surface. The rupture disc 30 with the concave-shaped bottom surface may also reduce the amount of debris released to the wellbore 92, which may become important for larger sized airlocks with large disc thicknesses and diameters.

In some embodiments friction between the side surface of the rupture disc 30 and the inner supporting surface 21 of the outer sled 20 may occur and such friction can depend on various factors, such as the taper angle. Thus, a lubricant may be disposed between the upper and/or lower portions 30a and 30b (particularly the lower portion 30b) of the side surface of rupture disc 30 and/or the uphole and downhole portions 21a and 21b of inner supporting surface 21 of the outer sled 20 to facilitate a sliding engagement between the rupture disc 30 and the outer sled 20 that assists in allowing the rupture disc 30 to be wedged into and supported by the supporting surface 21 and radial compressive forces to be applied to the rupture disc 30. With such lubrication, the friction between rupture disc 30 and the outer sled 20 can be reduced, and some amount of movement of the rupture disc 30 into the outer sled 20 is permitted while pressure is applied to the pressure facing surface of the rupture disc 30. In other embodiments a lubricant may be disposed between the outer surface 25a of inner sled 25 and the inner surface 22 of outer sled 20. In some embodiments, the lubricant includes a grease. However, other lubricants or other materials to permit such movement may be employed, for example, Teflon-based compounds or API pipe lubricant (Copper-Kote).

According to the embodiments described above, the rupture disc assembly 10 functions as a temporary upper seal for the buoyant chamber 120 in the casing string 94 shown in FIG. 1. However, it is to be understood that this is one application and that other applications are possible and within the scope of this disclosure. In some embodiments, the rupture disc assembly 10 is used to create a temporary seal for any suitable tubing. The tubing can be a casing string as described above, a liner, or any other suitable tubing. However, other applications that may not involve tubing are possible. More generally, the rupture disc assembly 10 can be used in a tank, a pressure vessel, a frac port, or any other suitable vessel. For example, the temporary seal created by the rupture disc assembly 10 may be useful as a safety measure, for example, to limit how much pressure is permitted inside the tank or pressure vessel and enabling the rupture disc 30 to break before pressure inside the tank reaches a dangerous level. In the case of a frac port, for example, the rupture disc assembly 10 can be used for creating a temporary seal for the frac port.

Method of Installing Casing String

Referring to FIG. 1, the rupture disc assembly 10, can be used in a method for installing a casing string in a wellbore, and in a method to float a casing during the installation of the casing string 94 in the wellbore 92. As noted above, running a casing string in a deviated wellbore, especially with long horizontal segments, can result in significant drag forces. The casing string 94 may become stuck before reaching a desired location. This is especially the case when downhole forces produced by pushing the weight of the casing string 94 in the wellbore 92 are less than the uphole drag forces. When higher forces are applied to try and push the casing string 94 further into the wellbore 92, damage to the casing string 94 can result.

In a method of installing a casing string 94, the casing string 94 is initially made up at the surface. There may be one or more pup joints or similar piping installed. The landing collar is then installed on the casing string 94. In some embodiments, drilling mud is added to ensure that the float shoe 96 is functioning properly. Generally, no fluid is added to the casing string 94 prior to installing the rupture disc assembly 10 (unless a liquid or a gas other than air is to be used to fill the buoyant chamber 120). Once a desired amount of the casing string 94 has been run into the wellbore 92, the rupture disc assembly 10 is installed, trapping air within the casing between the float shoe 96 and the rupture disc assembly 10. A remaining amount of the casing string 94 is then run into the wellbore 92 until the friction drag between the casing string 94 with the walls of the wellbore 92 will not allow the casing string 94 to be run to a greater depth. When run to a desired or maximum depth, the float shoe 96 may be located at the heel of the well, or within the horizontal segment of the well some distance from the "toe" or bottom of the wellbore 92. The rupture disc assembly 10 may be positioned in the vertical segment 130 of the wellbore 92 or near the heel. The weight of the casing string 94 in the vertical segment 130 assists in overcoming the friction drag to allow the casing string 94 to be positioned at a greater depth, and/or to be moved horizontally in the wellbore 92. An acting pressure during run-in must be less than the burst pressure of the rupture disc 30, to prevent premature rupture of the rupture disc 30 (and must also remain below the disc failure trigger pressure). Generally, the rupture disc assembly 10 may have a pressure rating of 7,500 to 30,000 psi, for example.

Once the casing string 94 has been run and landed, circulating equipment may be installed. The rupture disc 30 may then be burst by pressuring the casing string 94 from the surface to the disc failure trigger pressure. To accomplish this, acting pressure (e.g., from the surface) is applied through the casing string 94. The acting pressure exerts force on the pressure facing surface of the rupture disc 30, and on the actuating mechanism 12 supporting the rupture disc 30 in place, as discussed above. When the acting pressure reaches or exceeds the disc failure trigger pressure, the actuating mechanism 12 is activated triggering the movable sleds 20, 25, rupture disc 30 and ring 330 to move downhole causing the subsequent shattering/breaking of the rupture disc 30 to change the rupture disc assembly 12 to the disc failure mode, as previously described. Once the rupture disc 30 has burst, fluid pumping may be continued for a short time, and then stopped. Rupture of the rupture disc 30 should be evident from the surface by observation of a pressure drop in the casing string 94.

After the steps involved in installing the float tool into the wellbore 92 have been performed to place the rupture disc assembly 10 in the sealing mode, and the rupture disc 30 has been ruptured thereby changing the rupture disc assembly to the disc failure mode, additional operations can be performed. Fluid flow through the casing string 94 can allow air or other fluid or gas that was in the buoyant chamber 120 to rise to the surface and be vented from the casing string 94, for example. The casing string 94 can then be filled with other fluid (for e.g. non-flotation fluid). For example, the casing string 94 can be filled with drilling fluid. When the float shoe 96 is opened, conventional cementing operations can begin. It is also possible to use the float tool of the present disclosure in reverse cementing operations. In reverse cementing, a cement slurry can be pumped down the annulus 110 rather than through the casing string 94. When cementing operations are performed, a cement plug is delivered through the casing string 94.

In a preferred embodiment, once the rupture disc 30 has been ruptured, an inside diameter of the casing string 94 in a region where the rupture disc assembly 10 is installed is substantially the same as, or not less than, or greater than an inside diameter of the tubular members making up the remainder of the casing string 94. In an embodiment, the rupture disc 30 may be installed in a widened region of the casing string 94 (for e.g. within radially expanded portions of one or more of the upper or lower tubulars members, the tubular members being connectable to other tubulars in the casing string 94). The ability to restore the inside diameter of the casing string 94 where the rupture disc assembly is placed is especially useful since downhole tools and the like can be deployed into the casing string 94 without restriction once the rupture disc 30 has been broken, and without the need to remove any part of the float tool. Because the inside diameter if the casing string 94 is restored. the present method and the float tool are especially useful in ball drop, plug, shifting tool systems etc.

Numerous modifications and variations of the present disclosure are possible in light of the above teachings. It is therefore to be understood that within the scope of the appended claims, the disclosure may be practised otherwise than as specifically described herein.

The invention claimed is:

1. A rupture disc assembly for use in a vessel, the rupture disc assembly comprising:
   a rupture disc comprising a pressure facing surface, a bottom surface, and a side surface having a taper inward towards the bottom surface of the rupture disc;
   an actuating mechanism configured to support the rupture disc and operable to be activated when the pressure facing surface of the rupture disc is subjected to a disc failure trigger pressure, the actuating mechanism comprising:
   i) an outer sled operable to move in a downhole direction from a first position to a second position after activation of the actuating mechanism, the outer sled comprising an inner supporting surface having an inward taper complementary to and abutting the taper of the side surface of the rupture disc to permit transmission of radial compressive forces from the outer sled to the rupture disc and a bottom surface;
   ii) an inner sled disposed within the outer sled and operable to move in a downhole direction from a first position to a second position after activation of the actuating mechanism, the inner sled comprising a cylindrical inner surface, a support shoulder configured to abut with at least a segment of the bottom surface of the rupture disc and a bottom surface downhole from the bottom surface of the outer sled;
   iii) a securing mechanism operable to secure the outer sled and inner sled in their first positions and release the outer sled and inner sled after activation of the actuating mechanism;
   wherein the rupture disc is operable to form a temporary seal within the rupture disc assembly when the outer sled and inner sled are in their first positions and, after activation of the actuating mechanism, to break after the inner sled reaches its second position.

2. The rupture disc assembly of claim 1, further comprising a housing configured to house the rupture disc and actuating mechanism, the housing comprising a) an upper tubular member having an upper end, a lower end and an interior surface defining a fluid passageway therethrough and b) a lower tubular member having an upper end coupled to the lower end of the upper tubular member, a lower end and an interior surface defining a fluid passageway therethrough with a stop shoulder positioned on the interior surface operable to stop downhole movement of the inner sled at its second position when the bottom surface of the inner sled contacts the stop shoulder.

3. The rupture disc assembly of claim 2, wherein the actuating mechanism further comprises a ring abutting the inner supporting surface of the outer sled and having an impact surface, and wherein the ring is operable to move in downhole direction after activation of the actuating mechanism.

4. The rupture disc assembly of claim 3, wherein in operation, in response to the pressure facing surface of the rupture disc being subjected to pressure at least equal to the disc failure trigger pressure, the actuating mechanism is activated and the securing mechanism releases the outer sled and inner sled allowing the outer sled and inner sled to begin to move in a downhole direction wherein movement of the inner sled stops at its second position while movement of the outer sled and ring continues and wherein the rupture disc breaks in response to the pressure facing surface being subjected to: a disc rupture pressure; the impact surface of the ring; or a combination thereof.

5. The rupture disc assembly of claim 4, wherein the impact surface comprises a plurality of spaced apart ridges on a bottom surface of the ring.

6. The rupture disc assembly of claim 4, wherein the impact surface comprises a plurality of spaced apart carbide-tipped projections on a bottom surface of the ring.

7. The rupture disc assembly of claim 1, wherein the securing mechanism comprises a shear ring.

8. The rupture disc assembly of claim 1, wherein the inward taper is configured to provide a taper angle between 3 degrees and 30 degrees such that the transmission of the radial compressive forces from the outer sled to the rupture disc, while pressure is being applied to the pressure facing surface of the rupture disc, is adapted to reduce or eliminate tensile stresses in the rupture disc.

9. An apparatus for forming a buoyant chamber in a well, the apparatus comprising:
a) a first length of tubing operable to be positioned in the well and having an uphole end and a down hole end operable for connection to a second length of tubing having a float device operable for forming a lower boundary of a buoyant chamber and
b) the rupture disc assembly of claim 2 coupled to the uphole end of the first length of tubing and operable for forming an upper boundary of the buoyant chamber during deployment of the buoyant chamber into the well.

10. A casing string float assembly comprising a tubular having a lower seal in a lower position of the tubular, the rupture disc assembly of claim 1 at an upper position of the tubular to form an upper boundary and a buoyant chamber positioned between the lower boundary and the upper boundary.

11. A rupture disc assembly for use in a vessel, the rupture disc assembly comprising:
a rupture disc comprising a pressure facing surface, a bottom surface, and a side surface having a taper inward towards the bottom surface of the rupture disc;
an actuating mechanism configured to support the rupture disc and operable to be activated when the pressure facing surface of the rupture disc is subjected to a disc failure trigger pressure, the actuating mechanism comprising:
an outer sled operable to move in a downhole direction from a first position to a second position after activation of the actuating mechanism, the outer sled comprising an inner supporting surface having an inward taper complementary to and abutting the taper of the side surface of the rupture disc to permit transmission of radial compressive forces from the outer sled to the rupture disc and a bottom surface;
an inner sled disposed within the outer sled and operable to remain stationary in a first position after activation of the actuating mechanism, the inner sled comprising a cylindrical inner surface, a support shoulder configured to abut with at least a segment of the bottom surface of the rupture disc and a bottom surface downhole from the bottom surface of the outer sled;
a securing mechanism operable to secure the outer sled and inner sled in their first positions and release the outer sled and inner sled after activation of the actuating mechanism;
wherein the rupture disc is operable to form a temporary seal within the rupture disc assembly when the outer sled and inner sled are in their first positions and, after activation of the actuating mechanism, to break after the outer sled reaches its second position.

12. The rupture disc assembly of claim 11, further comprising a housing configured to house the rupture disc and actuating mechanism, the housing comprising a) an upper tubular member having an upper end, a lower end and an interior surface defining a fluid passageway therethrough and b) a lower tubular member having an upper end coupled to the lower end of the upper tubular member, a lower end and an interior surface defining a fluid passageway therethrough and a stop shoulder positioned on the interior surface operable to stop downhole movement of the outer sled at its second position when the bottom surface of the inner sled contacts the stop shoulder.

13. The rupture disc assembly of claim 12, wherein the actuating mechanism further comprises a ring abutting the inner supporting surface of the outer sled and having an impact surface and wherein the ring is operable to move in downhole direction after activation of the actuating mechanism.

14. The rupture disc assembly of claim 13, wherein in operation, in response to the pressure facing surface of the rupture disc being subjected to hydraulic pressure at least equal to the disc failure trigger pressure, the actuating mechanism is activated and the securing mechanism releases the outer sled and inner sled wherein the inner sled remains stationary and the outer sled moves in a downhole direction until it reaches its second position and the rupture disc breaks in response to the pressure facing surface being subjected to: a pressure of at least a disc rupture pressure; the impact surface of the ring; or a combination thereof.

15. The rupture disc assembly of claim 14, wherein the impact surface comprises a plurality of spaced apart ridges on a bottom surface of the ring.

16. The rupture disc assembly of claim 14, wherein the impact surface comprises a plurality of spaced apart carbide-tipped projections on a bottom surface of the ring.

17. The rupture disc assembly of claim 11, wherein the securing mechanism comprises a shear ring.

18. The rupture disc assembly of claim 11, wherein the inward taper is configured to provide a taper angle between 3 degrees and 30 degrees such that the transmission of the radial compressive forces from the outer sled to the rupture disc, while pressure is being applied to the pressure facing surface of the rupture disc, is adapted to reduce or eliminate tensile stresses in the rupture disc.

19. An apparatus for forming a buoyant chamber in a well, the apparatus comprising:
   a) a first length of tubing operable to be positioned in the well and having an uphole end and a downhole end operable for connection to a second length of tubing having a float device operable for forming a lower boundary of a buoyant chamber and
   b) the rupture disc assembly of claim 12 coupled to the uphole end of the first length of tubing and operable for forming an upper boundary of the buoyant chamber during deployment of the buoyant chamber into the well.

20. A casing string float assembly comprising a tubular having a lower seal in a lower position of the tubular, the rupture disc assembly of claim 11 at an upper position of the tubular to form an upper boundary and a buoyant chamber positioned between the lower boundary and the upper boundary.

* * * * *